(12) United States Patent
Loudot (10) Patent No.: US 12,489,376 B2
(45) Date of Patent: Dec. 2, 2025

(54) FLYING CAPACITOR DEVICE AND METHOD FOR PRELOADING THE CAPACITORS OF SUCH A DEVICE

(71) Applicants: AMPERE S.A.S., Boulogne Billancourt (FR); NISSAN MOTOR CO., LTD., Kanagawa (JP)

(72) Inventor: Serge Loudot, Guyancourt (FR)

(73) Assignees: AMPERE S.A.S., Boulogne Billancourt (FR); NISSAN MOTOR CO., LTD., Kangawa (JP)

( * ) Notice: Subject to any disclaimer, the term of this patent is extended or adjusted under 35 U.S.C. 154(b) by 0 days.

(21) Appl. No.: 18/838,099

(22) PCT Filed: Jan. 25, 2023

(86) PCT No.: PCT/EP2023/051792
§ 371 (c)(1),
(2) Date: Aug. 13, 2024

(87) PCT Pub. No.: WO2023/160933
PCT Pub. Date: Aug. 31, 2023

(65) Prior Publication Data
US 2025/0149999 A1    May 8, 2025

(30) Foreign Application Priority Data
Feb. 24, 2022 (FR) .................................. 2201646

(51) Int. Cl.
*H02M 7/483* (2007.01)
*B60L 15/00* (2006.01)
(Continued)

(52) U.S. Cl.
CPC ......... *H02M 7/4837* (2021.05); *B60L 15/007* (2013.01); *H02M 1/0095* (2021.05);
(Continued)

(58) Field of Classification Search
CPC .... H02M 7/4837; H02M 1/0095; H02M 1/12; H02M 3/07; H02M 3/158; B60L 15/007; B60L 2210/14
See application file for complete search history.

(56) References Cited

U.S. PATENT DOCUMENTS

| 8,680,899 B2 * | 3/2014 | Soe ...................... H03K 21/023 |
| | | 327/117 |
| 10,340,794 B1 * | 7/2019 | Zhang ................... H02M 3/158 |

(Continued)

FOREIGN PATENT DOCUMENTS

WO    WO 02/13364 A1    2/2002

OTHER PUBLICATIONS

International Search Report issued Apr. 6, 2023 in PCT/EP2023/051792 filed Jan. 25, 2023, 3 pages.
(Continued)

*Primary Examiner* — Rexford N Barnie
*Assistant Examiner* — Esayas G Yeshaw
(74) *Attorney, Agent, or Firm* — Oblon, McClelland, Maier & Neustadt, L.L.P.

(57) ABSTRACT

A flying capacitor device, such as an inverter arm or a boost converter, includes a plurality of N switching cells which are nested in one another and a balancing circuit which is adapted to have a resonant frequency equal to the switching frequency of the transistors. The balancing circuit is connected, on the one hand, at a midpoint and at a terminal of a capacitor of the last cell.

12 Claims, 12 Drawing Sheets

(51) Int. Cl.
  *H02M 1/00* (2006.01)
  *H02M 1/12* (2006.01)
  *H02M 3/07* (2006.01)
  *H02M 3/158* (2006.01)
(52) U.S. Cl.
  CPC ............... *H02M 1/12* (2013.01); *H02M 3/07* (2013.01); *B60L 2210/14* (2013.01); *H02M 3/158* (2013.01)

(56) References Cited

U.S. PATENT DOCUMENTS

| | | | |
|---|---|---|---|
| 10,886,832 B2 | 1/2021 | Yoscovich et al. | |
| 11,736,007 B2* | 8/2023 | Liu ......................... | H02M 3/01 323/282 |
| 2015/0280608 A1 | 10/2015 | Yoscovich et al. | |
| 2015/0288296 A1* | 10/2015 | Kidera ................ | H02M 7/5387 363/132 |
| 2016/0181950 A1 | 6/2016 | Yoscovich et al. | |
| 2017/0214309 A1 | 7/2017 | Yoscovich et al. | |
| 2019/0296633 A1 | 9/2019 | Yoscovich et al. | |
| 2019/0305665 A1 | 10/2019 | Yoscovich et al. | |
| 2019/0312500 A1 | 10/2019 | Yoscovich et al. | |
| 2020/0266697 A1 | 8/2020 | Yoscovich et al. | |
| 2020/0266698 A1 | 8/2020 | Yoscovich et al. | |
| 2021/0083564 A1 | 3/2021 | Yoscovich et al. | |
| 2022/0231593 A1 | 7/2022 | Yoscovich et al. | |
| 2023/0077529 A1* | 3/2023 | Lin ......................... | H02M 3/07 323/271 |
| 2023/0375641 A1* | 11/2023 | Lai ......................... | G01R 31/52 |
| 2023/0396168 A1* | 12/2023 | Choi ..................... | H02M 3/158 |

OTHER PUBLICATIONS

French Preliminary Search Report Issued Sep. 20, 2022 in French Application 2201646 filed on Feb. 24, 2022, 4 pages (with English Translation of Categories of Cited Documents).

Stala., et al., "Results of Investigation of Multicell Converters With Balancing Circuit-Part 1", IEEE Transactions on Industrial Electronics, vol. 56, No. 7, 2009, 10 pages.

Stala, R., "The Switch-Mode Flying-Capacitor DC-DC Converters With Improved Natural Balancing", IEEE Transactions on Industrial Electronics, vol. 57, No. 4, 2010, 14 pages.

Stala, et al., "Experimental Study of a Multicell ac/ac Converter Balancing Circuit", *International Power Electronics and Motion Control Conference*, 2008, 5 pages.

Rusfa, et al., "Harmonics Suppression using a GaN-based Flying-Capacitor Multilevel Inverter with PWM Operation at 13.6 MHz", IEEE Energy Conversion Congress and Exposition, 2021, 8 pages.

* cited by examiner

FLYING CAPACITOR DEVICE AND METHOD FOR PRELOADING THE CAPACITORS OF SUCH A DEVICE

The present invention relates to a flying capacitor device, such as an inverter or a boost converter.

In the field of electric motor vehicles, it is known that 800 V electric traction systems impose constraints on the semiconductors which are usually sized to 1200 V of cutoff voltage.

However, it is known that using, in series, 650 V components via a multicellular, or flying capacitor, topology has several advantages:
- using lower-voltage components have a better figure of merit for operating at high frequency, such as gallium nitride transistors;
- this makes it possible to have an output voltage the harmonic spectrum of which is more favorable, on the one hand because of the lower amplitude of the switching edges and on the other hand because the first harmonic resulting from the switching is pushed to $N*F_{sw}$, where $F_{sw}$ is the switching frequency of the transistors and N the number of switching cells, which makes possible a significant gain in terms of filtering volume and of the dynamic of controlling the output current.

Figure 1A:
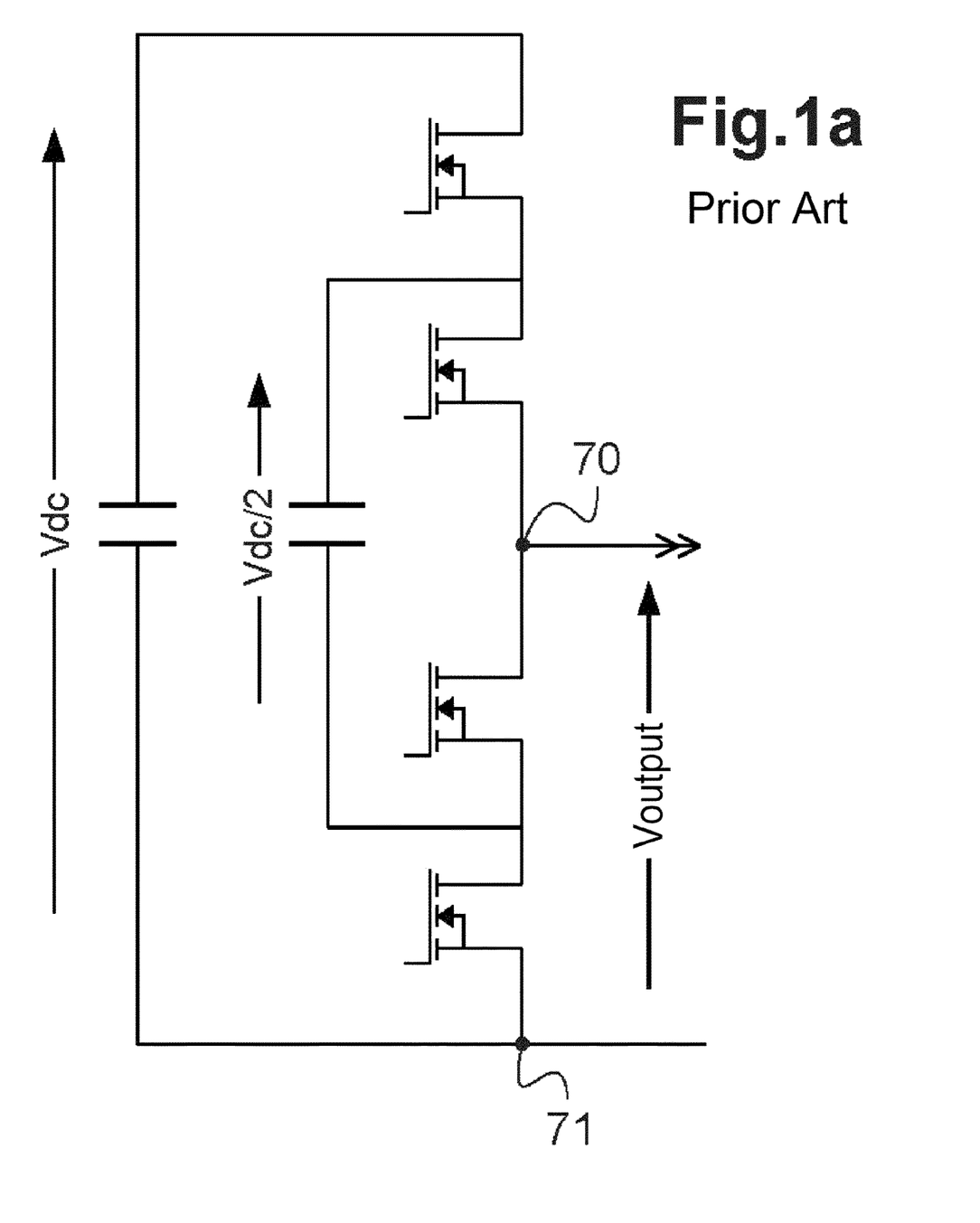
FIG. 1a is a schematic view of a device composed of two flying capacitor cells which is known from the prior art.
Figure 1B:
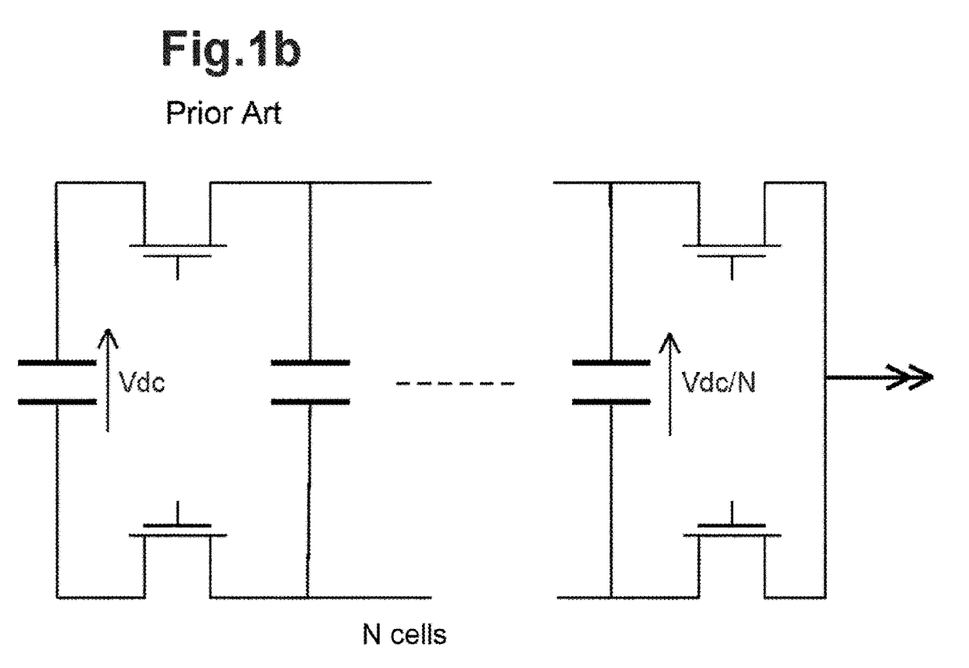
FIG. 1b is a schematic view of a generalization of a device to N flying capacitor cells from the prior art.

Thus, a multicellular topology is known from the prior art. FIG. 1, from the prior art, depicts, in FIG. 1a, an arm with 2 cells and, in FIG. 1b, its generalization to N cells.

While the frequency of the 1st harmonic is the switching frequency of the transistors multiplied by the number of cells.

In the technical field, this performance is advantageous in particular for:
- onboard single-phase chargers for boost systems for compensating for fluctuations in instantaneous power, by increasing the dynamic of regulating the current and by addressing the 800 V network with 650 V components;
- boost converters for supplying power to the network by means of several sources in parallel of different voltages. Typically a fuel cell and a battery. Indeed, the gain in terms of filtering volume is significant, as well as in efficiency with the use of transistors with a large gap such as gallium nitride transistors, for example; as well as
- inverters for controlling innovative machines where a wide passband is necessary for delivering harmonic voltages which are multiples of the fundamental electrical frequency while at the same time being able to filter the spectrum resulting from the switching.

However, such a topology has the drawback of having to ensure the stability of the voltage of the flying capacitors at an average value, over a period of at least 1/Fsw, of $V_{dc}/N$, $2 V_{dc}/N$, $3 V_{dc}/N$ etc. (which can be seen in FIG. 1, from the prior art).

This balancing occurs naturally by letting flow current harmonics at the switching frequency of the transistors and its (N−1) multiples (N being the number of nested switching cells).

However, this balancing is insufficient or even non-existent in 2 cases:
- preloading the high-voltage circuit, prior to connecting the battery. In this case, the $1^{st}$ capacitor charges while the multilevel arm does not draw a current: natural balancing cannot occur and only the $1^{st}$ capacitor is charged, imposing, in fact, the voltage $V_{dc}$ on the transistors of the $1^{st}$ cell, with a high risk of destruction by overvoltage.
- in operation. If the load impedance is insufficient, the rebalancing of the voltages of the flying capacitors is too slow or even non-existent.

Thus, there is the need for a solution for balancing the voltages of the flying capacitors in the two cases outlined above.

To this end a flying capacitor device, such as an inverter or a boost converter, is proposed, comprising a plurality of N switching cells which are nested in one another, each cell comprising, between its connection terminals, two switchable transistors in series and a capacitor in parallel with the two transistors, the N cells being nested such that a second cell is nested in a first cell by being connected between the two transistors in series of the first cell; this nesting being repeated for the N nested cells, the Nth nested cell comprising its two transistors connected in series directly next to one another, an output voltage of said device being obtained from the potential difference between the midpoint situated between the two transistors of the Nth nested cell and a terminal of the capacitor of the first cell.

The flying capacitor device comprises a balancing circuit having a resonant frequency equal to the switching frequency of the transistors, said balancing circuit being connected, on the one hand, at said midpoint between the two transistors of the $N^{th}$ cell and at said terminal of the capacitor of the first cell.

Advantageously, said balancing circuit comprises an RLC resonant circuit in series. In other words, a resonant circuit comprising a resistor, an inductor and a capacitor connected in series. Thus, this device is relatively inexpensive to manufacture and is particularly reliable.

In particular, the device comprises only two switching cells.

Advantageously, the flying capacitor device comprises a bandpass filter, and said balancing circuit comprises at least one capacitor shared with said bandpass filter. Thus, resources can be shared between the bandpass filter and the balancing circuit.

Advantageously, the balancing circuit comprises a switch connected in series with the RLC circuit. Thus, the periods of forced or natural balancing of the flying capacitors can be controlled.

Advantageously, the flying capacitor device comprises a bandpass filter the passband of which is centered on the switching frequency of the transistors, the bandpass filter being connected in parallel with the switch.

In particular, the device comprises two switching cells.

Advantageously, the flying capacitor device further comprises a low-pass filter, and said balancing circuit comprises at least one inductor shared with said low-pass filter.

The invention also concerns a power conversion system comprising at least one flying capacitor device as claimed in any one of the preceding claims.

The invention also concerns a vehicle comprising a power conversion system as described above.

The invention also concerns a method for preloading a flying capacitor device as described above, in particular when the balancing circuit comprises a switch connected in series with said RLC resonant circuit, comprising:
- a step of closing the switch;
- a step of preloading the flying capacitors so as to switch the switchable transistors of each cell at the switching frequency of the transistors, a step of comparing between the voltage of the capacitor of the first cell and a predetermined voltage;

a step of opening the switch when said voltage of the capacitor of the first cell is substantially equal to the predetermined voltage.

According to an alternative, when the flying capacitor device comprises a bandpass filter the passband of which is centered on the switching frequency of the transistors, the bandpass filter being connected in parallel with the switch, the invention concerns a method for preloading a flying capacitor device comprising:

a step of measuring the voltage of the switch, in its open state, filtered by the bandpass filter;

a step of closing the switch if the measured voltage exceeds a predetermined imbalance threshold;

a step of preloading the flying capacitors so as to switch the switchable transistors of each cell at the switching frequency of the transistors, a step of comparing between the voltage of the capacitor of the first cell and a predetermined voltage;

a step of opening the switch when said voltage of the capacitor of the first cell is substantially equal to the predetermined voltage.

The invention will be better understood upon reading the detailed description of an embodiment of the invention with reference to the figures:

FIGS. 1a and 1b depict the topology of a two-level inverter arm with nested cells (or flying capacitors) and its generalization to N cells, respectively.

This topology, known to a person skilled in the art, has several advantages:

the spectral content of the delivered voltage is much less rich since the harmonic spectrum of the chopping begins at N times the switching frequency of the transistors for an amplitude N times lower.

Figure 3:
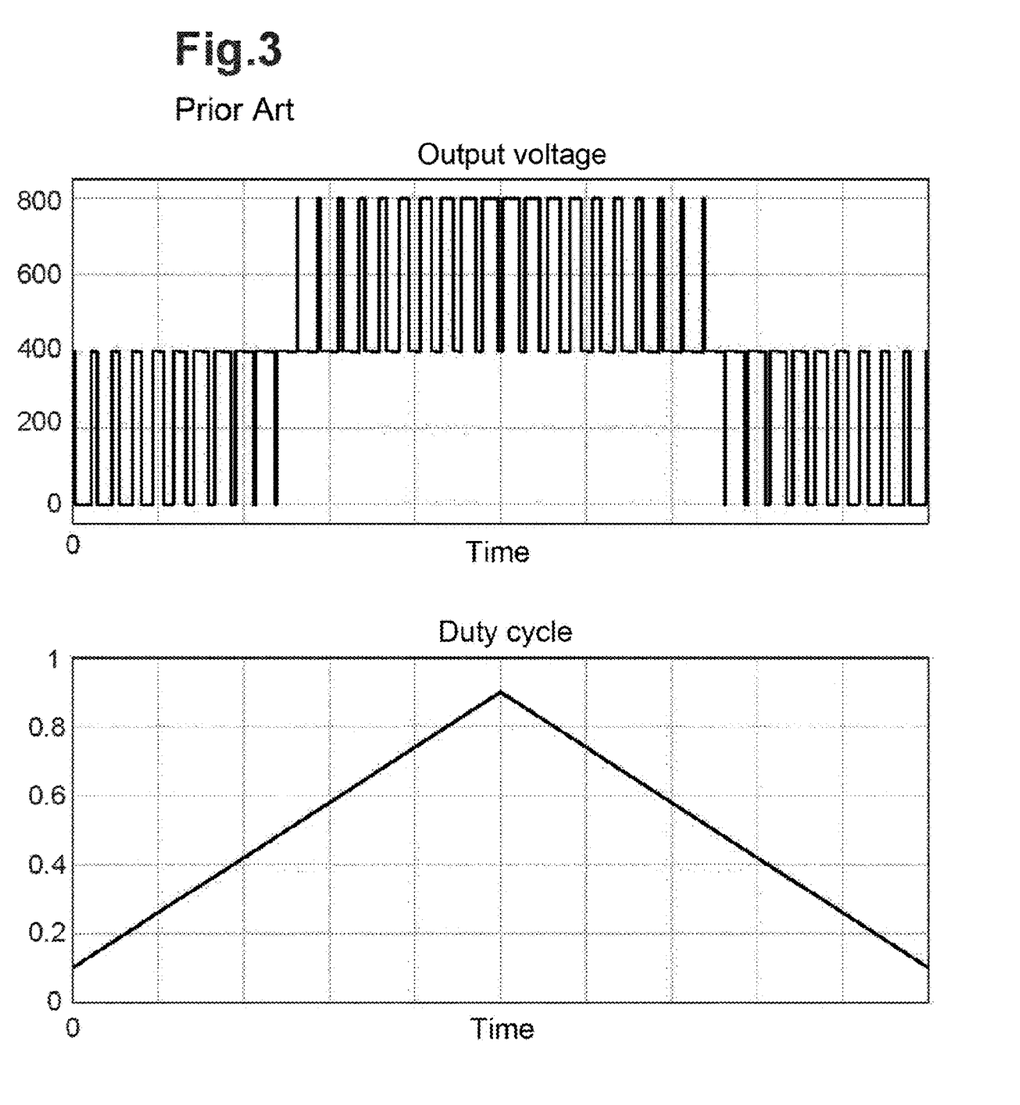
FIG. 3 is a view of the shape of the output voltage of a flying capacitor device according to the prior art.

FIG. 3 depicts the voltage produced for an arm with 2 cells which is supplied with 800 V (for a triangular voltage setpoint ranging from 0.1*800=80 V to 0.9*800 V=720 V): the amplitude of the edges is 400 V, while the frequency of the voltage pulses is double the switching frequency of the transistors of the arm.

This modification of the spectrum with respect to that of an arm with a switching cell with two levels makes it possible to significantly reduce the size of the filtering which is necessary for attenuating these harmonics linked to the switching of the transistors.

It thus makes it possible to place several transistors in series while at the same time guaranteeing balancing of the voltages applied to each of them, insofar as the voltage of each flying capacitor is stabilized at its balance voltage ($V_{dc}/N$, $2 V_{dc}/N$, ... (N−1) $V_{dc}/N$).

In fact, it becomes possible to use, at high voltage (typically 800 V), lower-voltage components with better high-frequency switching abilities (typically GaN-based HEMT—high-electron-mobility transistor—components).

These advantages make it possible to significantly improve high-voltage converters which require a high regulation dynamic of the control of the current delivered, the main ones are:

converters charged with compensating for fluctuations in instantaneous power for single-phase chargers (where the instantaneous power, which is pulsed at 2 times the frequency of the network, produces current ripples in the battery being charged without compensation), boost converters, typically for associating, in parallel, several voltage sources, for example a fuel cell and a battery, inverters from which is required a wide passband of the voltage delivered in order to compensate for spatial deformations which are intrinsic to the machine to be controlled. For example, an iron powder machine.

In order for these advantages to remain valid, good balancing of the voltages of the flying capacitors must be guaranteed permanently, and notably:

in the preloading phase, where the voltage $V_{dc}$ increases (slowly, via a preloading system) from 0 to 800 V, for example, the vehicle is stationary and the multilevel converters do not draw a current, which compromises natural balancing; and in operation, in the event of a strong transient on the voltage $V_{dc}$, or in the event of the dispersion of the values of the flying capacitors (which should be of the same value).

Thus, the flying capacitors are suitably balanced when their voltage is at $V_{dc}/2$ in the case of 2 cells or $M*V_{dc}/N$ in the case of the $M^{th}$ cell when there are N nested switching cells.

When this balance is reached, each transistor then cuts off the same voltage equal to $V_{dc}/N$.

During the preloading phase, when the voltage $V_{dc}$ increases slowly, it is necessary to ensure that the voltages of the flying capacitors evolve in the same ratio.

Figure 2:
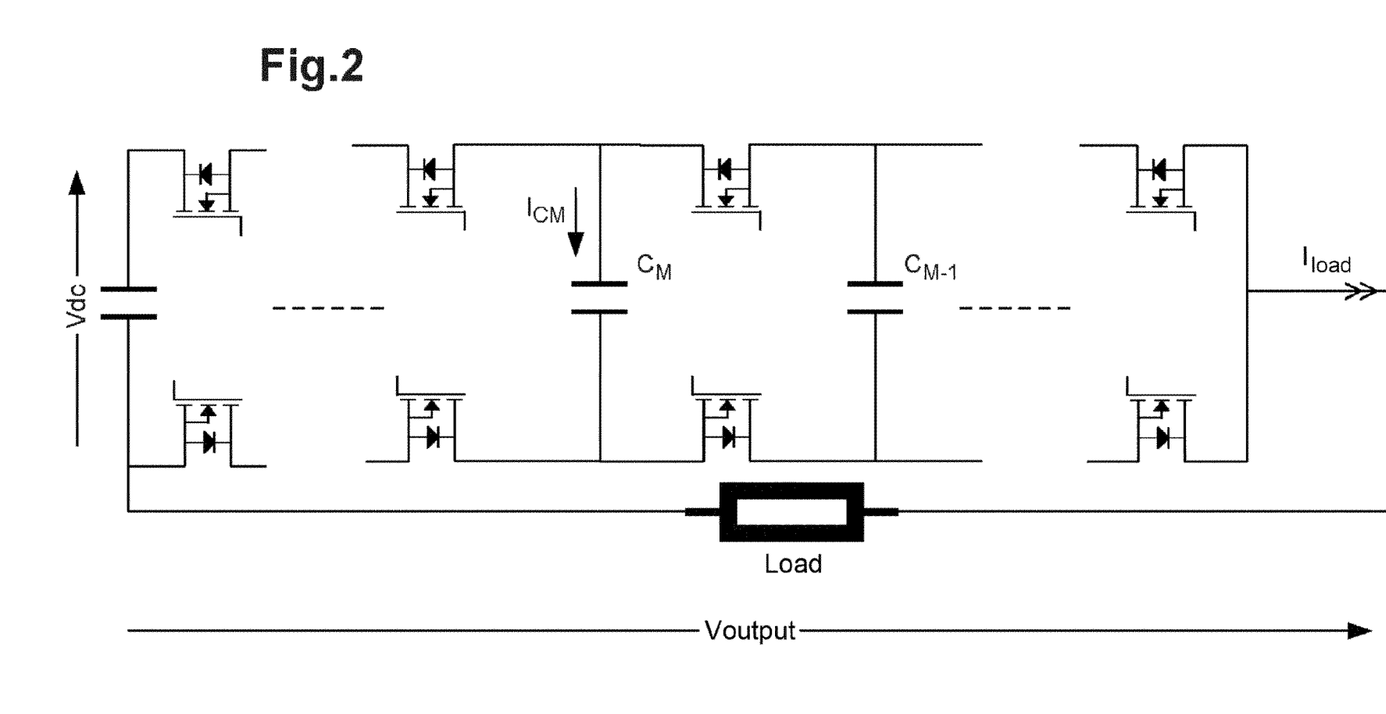
FIG. 2 is another schematic view of a generalization of a device to N flying capacitor cells from the prior art comprising an electrical load.

Knowing that, in this phase, with reference to FIGS. 1b and 2, the multicellular arm does not draw a current, $I_{load}=0$, the flying capacitors $C_i=1$ to N−1 cannot balance.

FIG. 2 shows that the current $I_{CM}$ of a flying capacitor of index M can, at a given instant, be either zero or equal to $I_{load}$ or to $-I_{load}$ according to the states of the transistors of the cells M and M−1 which surround it.

When the load has too high an impedance, the current $I_{CM}$ is insufficient to make the voltage of the capacitor $C_M$ vary with a sufficient dynamic with respect to that of the preloading, and therefore to protect the transistors from a destructive overvoltage.

In order to permanently balance the voltages of the flying capacitors, a resonant circuit 50, also called a balancing circuit 50, is added. The resonant frequency of the balancing circuit 50 is equal to the switching frequency $F_{sw}$ of the transistors.

Thus, according to the main embodiment of the invention, the flying capacitor device 1, 1', with reference to FIGS. 5a, 5b and 7a and 7b, such as an inverter 1 or a boost converter 1', comprises a plurality of N switching cells 2, 2' which are nested in one another, each cell 2, 2' comprising, between its connection terminals, two switchable transistors 21, 22, 21', 22' in series and a capacitor 23, 23' in parallel with the two transistors 21, 22, 21', 22'.

The N cells 2, 2' are nested such that a second cell 2 is nested in a first cell 2' by being connected between the two transistors 21', 22' in series of the first cell 2'.

This nesting is repeated for the N nested cells, the $N^{th}$ nested cell comprising its two transistors 21, 22 connected in series directly next to one another.

The output voltage $V_{output}$ of said device 1, 1' is thus obtained from the potential difference between the midpoint 70 situated between the two transistors 21, 22 of the $N^{th}$ nested cell, here the second cell 2, and the terminal 71 of the capacitor of the first cell 2'.

Figure 5A:
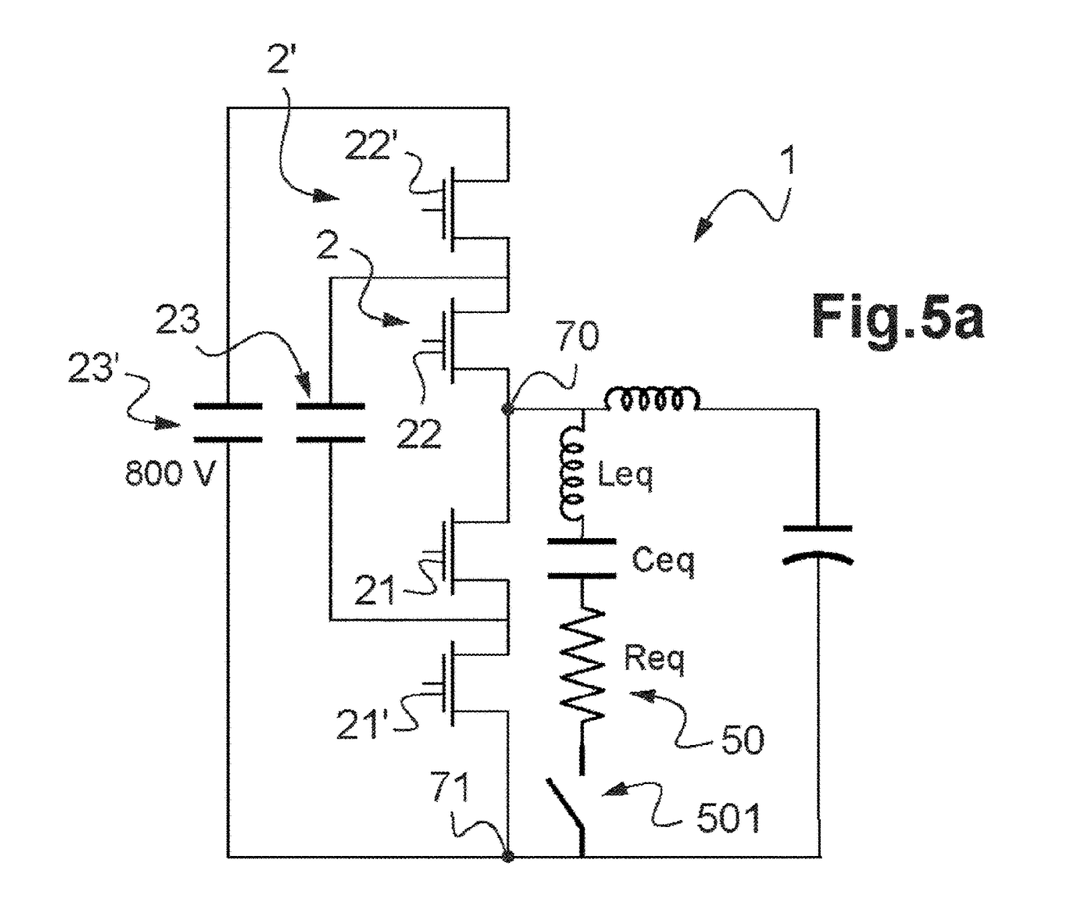
FIG. 5a is a schematic view of a flying capacitor device according to the invention comprising a dedicated balancing circuit.
Figure 5B:
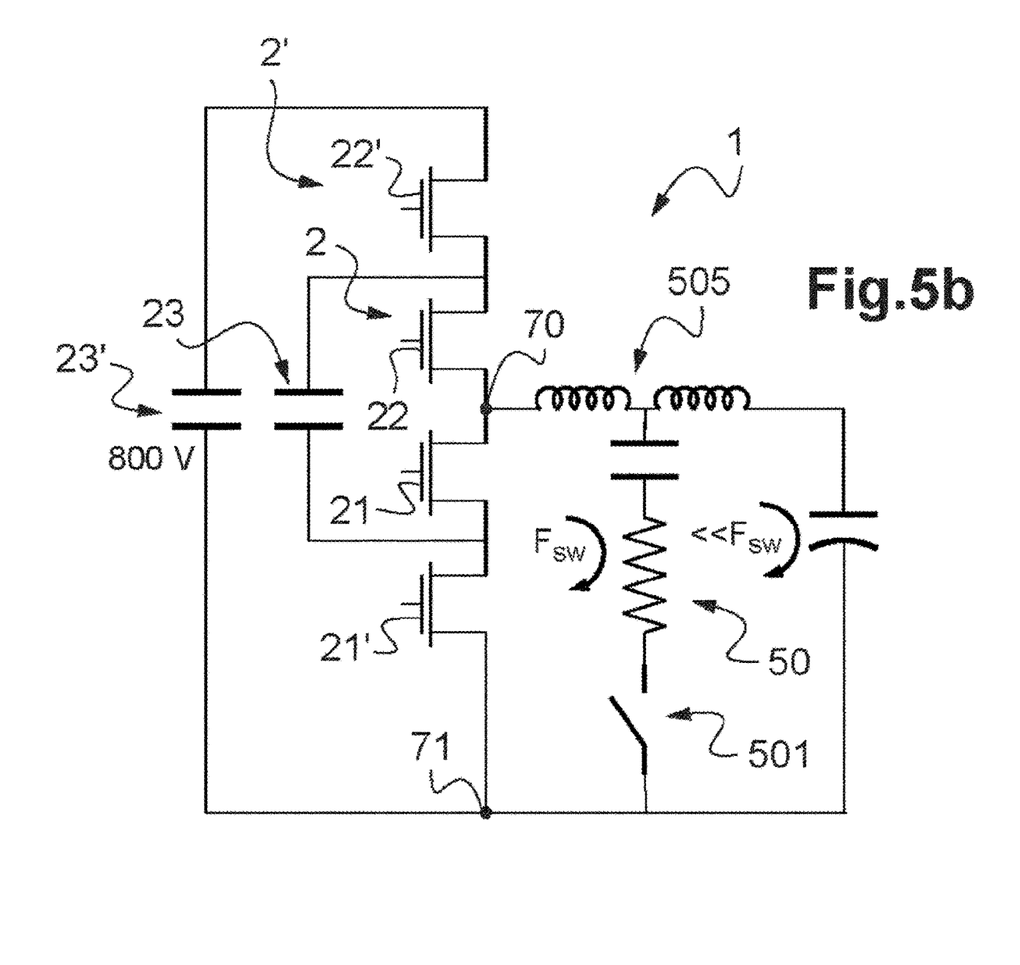
FIG. 5b is a schematic view of a flying capacitor device according to the invention comprising a balancing circuit comprising an inductor shared with a low-pass filter which is necessary for controlling the low-voltage current.

This device 1, 1' comprises a balancing circuit 50, here an RLC resonant circuit 50, comprising a capacitor Ceq, an inductor Leq and a resistor Req connected in series. The balancing circuit 50 is adapted to have a resonant frequency equal to the switching frequency of the transistors.

This balancing circuit 50 is connected, on the one hand, at the midpoint 70 between the two transistors of the $N^{th}$ cell and at the terminal 71 of the capacitor of the first cell 2'.

This resonant circuit 50 thus makes it possible to control the load impedance at this particular frequency $F_{sw}$ and, in fact, balance the flying capacitors whatever the payload impedance.

According to one particular implementation of the invention, this circuit can be connected and disconnected by a switch.

Figure 6:
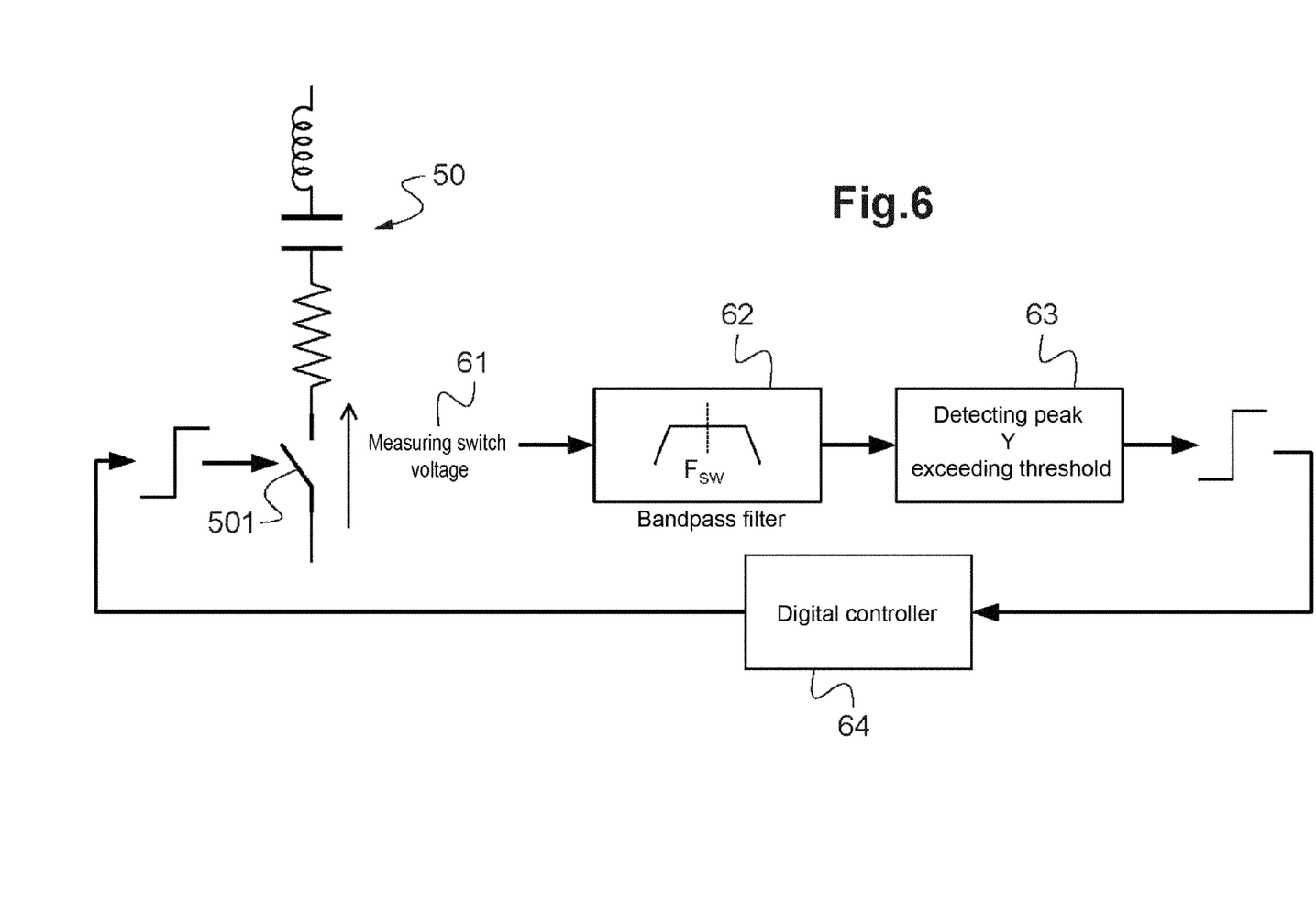
FIG. 6 is a schematic depiction of the method of operation of a circuit for detecting an imbalance according to one embodiment of the invention.

FIG. 6 schematically depicts an RLC resonant circuit 50 according to the invention connected in series by a four-quadrant switch which can be a mechanical or semiconductor switch.

Thus, during a preloading method, implemented by the invention, the voltage at the terminals of the high-voltage circuit increases quite slowly.

From the start of the preloading phase, the transistors are switched such that a current appears in the balancing circuit.

Figure 7A:
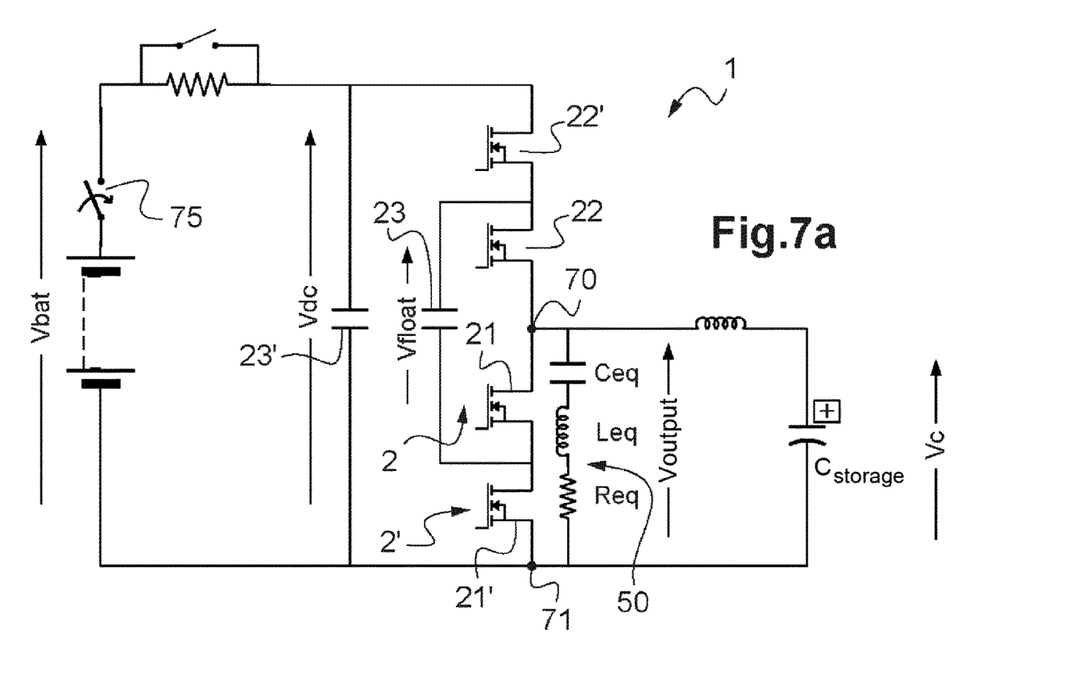
FIG. 7a is a schematic depiction of a converter supplied with power by a DC voltage source which can be connected according to one embodiment of the invention.

In one particular embodiment of the invention for a power fluctuation compensator for a single-phase charger or an inverter arm, FIG. 7a presents the diagram where the battery is on the high-voltage side.

Once the battery has been connected by closing its contactor 75, a DC duty cycle equal to the ratio $V_C/V_{bat}$ is applied, where $V_C$ is the voltage at which it is desired for the storage capacitor $C_{storage}$ to be preloaded and $V_{bat}$ the voltage of the battery at the moment when the contactor closes.

Figure 7B:
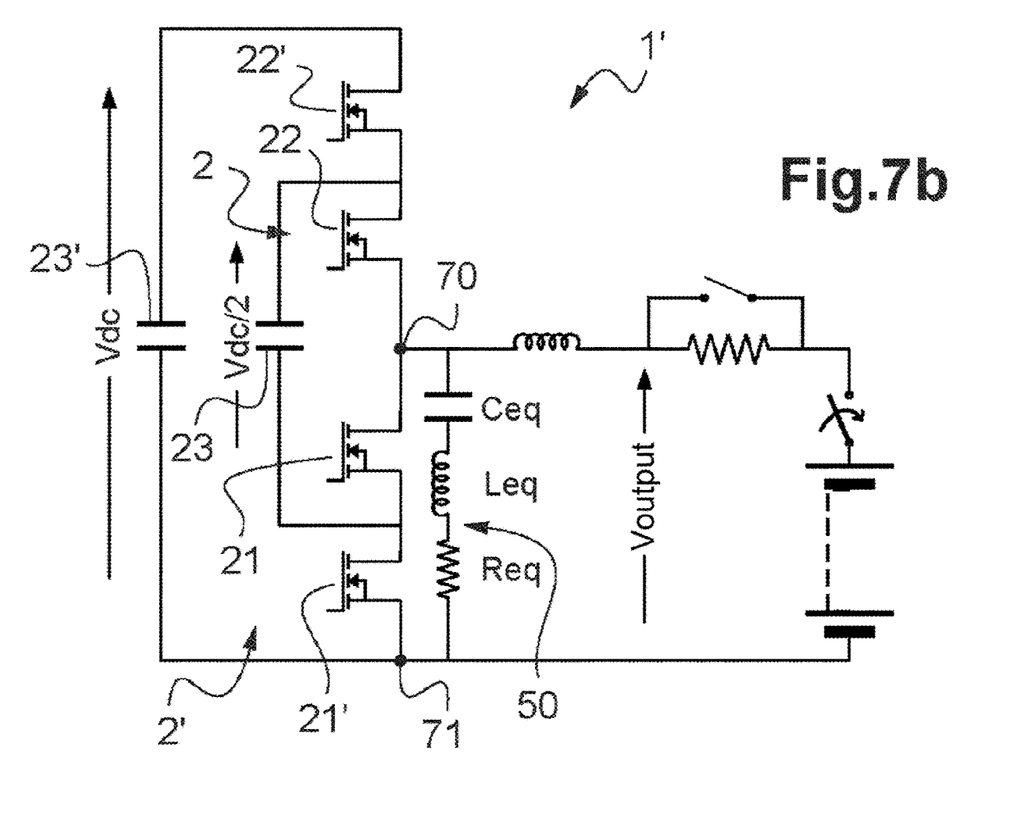
FIG. 7b is a schematic depiction of a boost converter according to one embodiment of the invention.

In the case of a boost converter, depicted in FIG. 7b, for a hybrid vehicle or fuel cell, the duty cycle applied during preloading will be in the ratio $V_{bat}/V_{dc}$, where $V_{bat}$ is the voltage of the battery connected on the low-voltage side and $V_{dc}$ the voltage desired on the high-voltage side, for example 800 V.

In the case of an inverter, as depicted in FIG. 7a, an identical duty cycle is applied to each arm supplying power to a phase of the motor.

Thus, only one homopolar current at N times the switching frequency $F_{sw}$ (N being the number of nested cells of each arm) is created in the phases of the motor without creating torque.

The balancing circuit 50 can be disconnected by an electronic or electromechanical switch 501 (which is visible in FIGS. 5a and 5b), in order that only the impedance of the payload of the converter balances the flying capacitors, which is illustrated by FIG. 6.

During the preloading phase, the resonant balancing circuit 50 is systematically connected then disconnected from the start of the operation of the arm, in other words from when it draws a current.

Figure 4A:
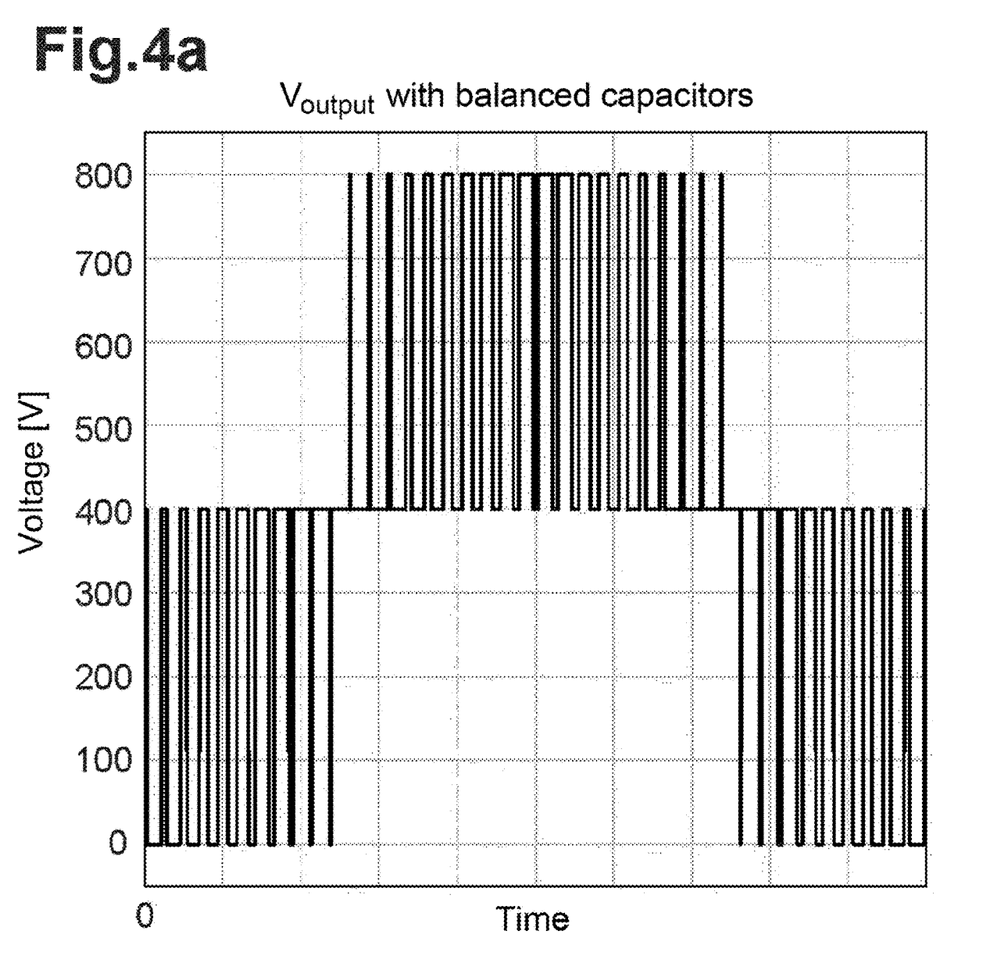
FIG. 4a is a schematic view, for a 2-level 800 V inverter arm with a control duty cycle identical to FIG. 3, of the shape of the voltage $V_{output}$ when there is a balance.
Figure 4B:
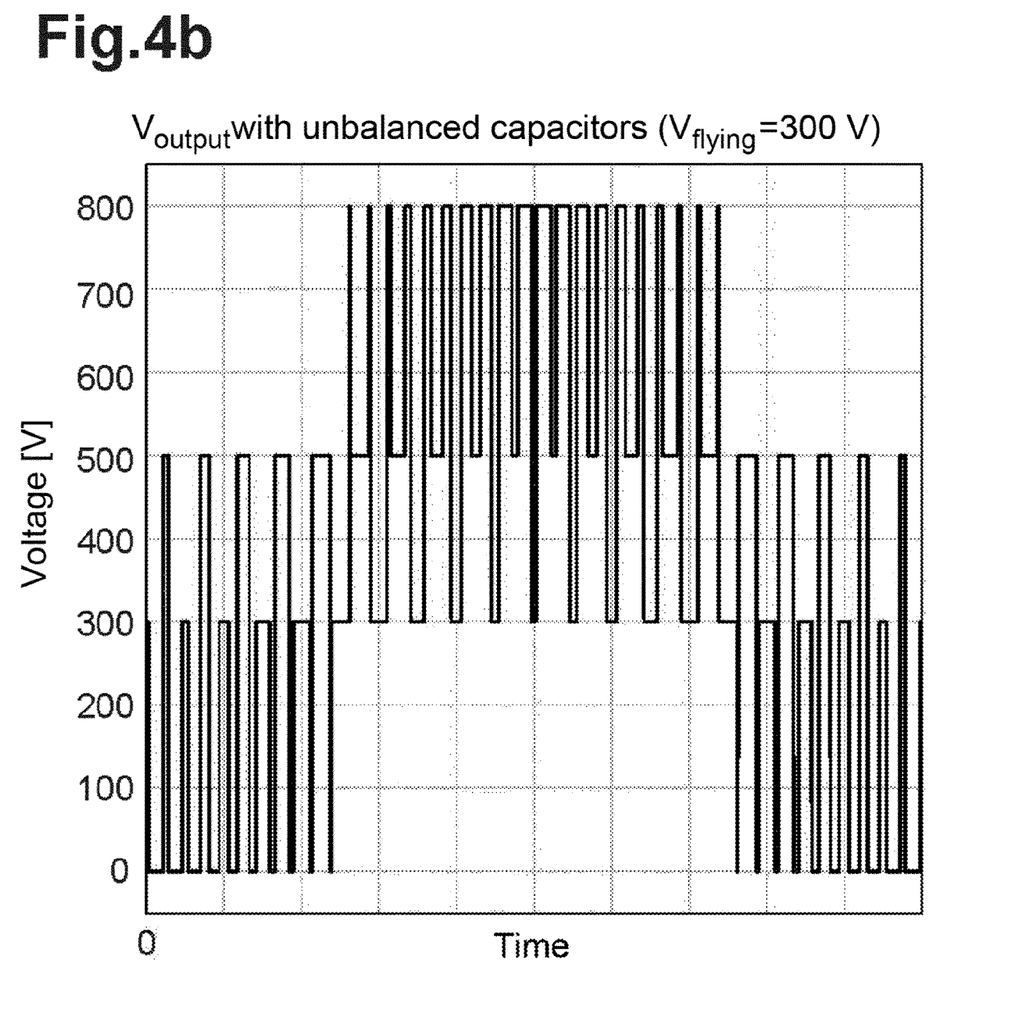
FIG. 4b is a schematic view, for a 2-level 800 V inverter arm in the same control conditions, of the shape of the voltage $V_{output}$ when there is an imbalance.

FIG. 4 depicts, for a 2-level 800 V inverter arm, the shape of the voltage $V_{output}$ when the flying capacitors are balanced (FIG. 4a), or a flying capacitor at 400 V, and when the flying capacitors are unbalanced (FIG. 4b), here a flying capacitor at 300 V for the same triangular modulant as depicted in FIG. 3.

Besides the overvoltage applied to 2 transistors, the appearance of a harmonic at the switching frequency $F_{sw}$ can be distinguished, while the 1st harmonic is at $2*F_{sw}$ in the event of a balance.

In fact, an RLC resonant circuit 50 tuned to this frequency $F_{sw}$ and connected in parallel with the load makes it possible to make flow exclusively a current dedicated to balancing with current loading at least.

FIG. 6 also shows the principle of a circuit for detecting an imbalance by processing the measurement of the voltage 61 at the terminals of the open switch. Beyond a certain imbalance threshold 63, that is to say if the load impedance is unsuitable for naturally balancing the flying capacitors, the control of the system 64 can order the switch 501 to be closed in order to ensure this rebalancing.

The measurement of the voltage 61 at the terminals of the open switch 501 of the RLC balancing circuit 50 makes it possible to measure this voltage and, via a bandpass filter 62 centered on the frequency $F_{sw}$, detect the amplitude of the harmonic at $F_{sw}$ (or within +/−15%, for example), which is a marker of imbalance.

The imbalance is generally considered to be significant when it exceeds 10% to 20% of $V_{dc}/N$ (or 40 to 80 V in the case of 2 levels for $V_{dc}=800$ V which is presented).

This solution is advantageous since it requires only one simple analog circuit permanently referenced on the basis of the inverter arm (unlike a direct measurement of the voltage of the flying capacitors).

Figure 8:
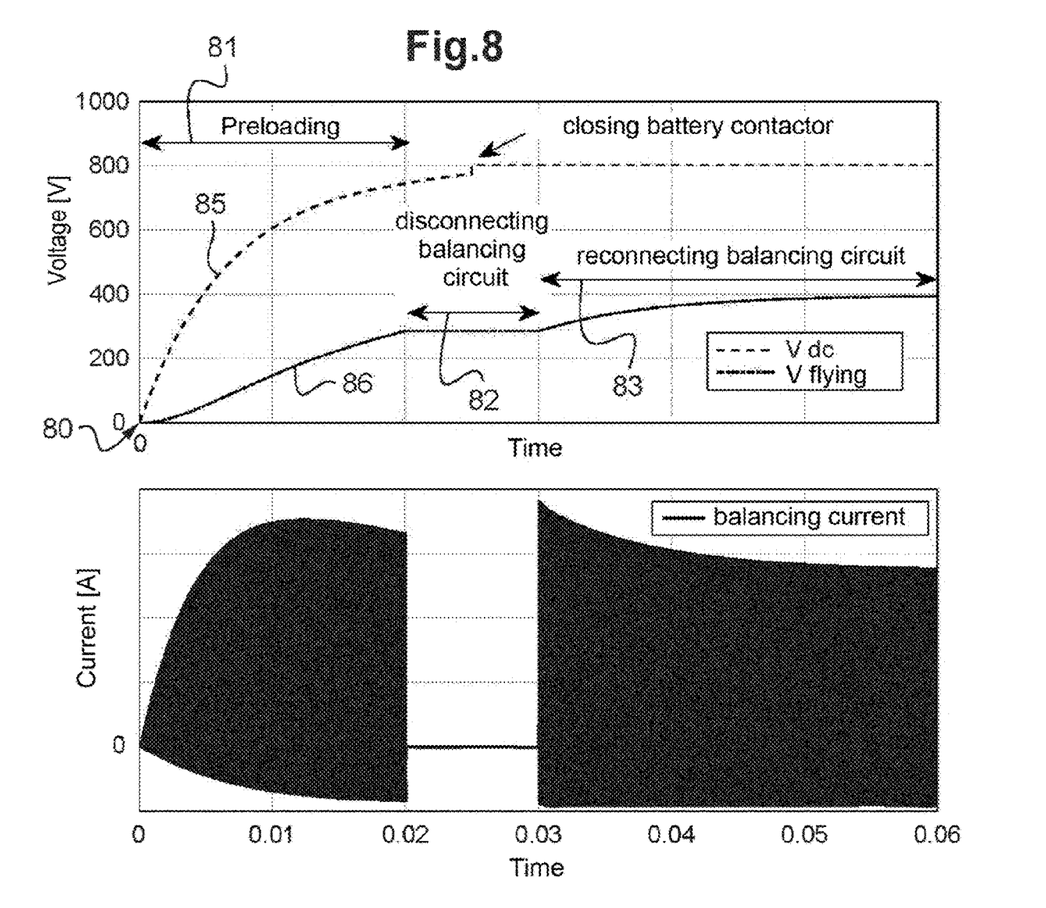
FIG. 8 depicts, in the form of a time graph, a preloading protocol for a circuit for compensating for fluctuations in power (FIG. 7a) according to one embodiment of the invention.

FIG. 8 depicts an example of a preloading protocol for a circuit for compensating for fluctuations in power. The balancing circuit is connected 80 from the start of preloading 81, at the same time as the switching orders are launched. The intermediate capacitor 86 charges by virtue of the current in the balancing circuit.

It is seen that balancing 86 ceases from when the circuit is disconnected 82 and resumes after it is reconnected 83.

Thus, by means of this balancing phase in operation the following advantages are seen.

In operation, imperfect balancing of the flying capacitors can produce a significant current in the balancing circuit during a long period (typically several seconds). It is advantageous, in this case, to disconnect this circuit in order to let natural balancing occur via the current harmonics in the load.

Thus, once the preloading phase 81 has been carried out, the balancing circuit is disconnected 82 just before conversion starts.

In the event that an imbalance threshold is exceeded in operation, the control orders the switch 501 to be closed in order to connect the balancing circuit 50 again, as depicted in FIG. 6, for a given duration before reopening the contact. The detection threshold as well as the duration of the connection of the balancing circuit can be variable and a function of other measured parameters, in addition to the voltage at the terminals of the contact, such as the load current.

According to one embodiment of the invention, components can be combined and shared between the RLC balancing circuit according to the invention and a filtering circuit.

To this end, FIG. 5a depicts a dedicated balancing circuit and FIG. 5b depicts a balancing circuit comprising an inductor shared with the low-pass filtering 505 which is necessary for controlling the low-voltage current.

As inductors are the most voluminous and most dissipative passive components, sharing this component between the two functions can present a relatively significant gain in terms of volume.

The invention claimed is:

1. A flying capacitor device, comprising:
a plurality of N switching cells which are nested in one another, each cell comprising connection terminals and, between the connection terminals, two switchable transistors in series and a capacitor in parallel with the two transistors, the N cells being nested such that a second cell is nested in a first cell by being connected between the two transistors in series of the first cell, this nesting being repeated for the N nested cells, the $N^{th}$ nested cell comprising its two transistors connected in series directly next to one another, an output voltage of said device being obtained from a potential difference between a midpoint situated between the two transistors of the $N^{th}$ nested cell and a terminal of the capacitor of the first cell; and
a balancing circuit having a resonant frequency equal to the switching frequency of the transistors, said balancing circuit being connected at said midpoint between the two transistors of the $N^{th}$ cell and at said terminal of the capacitor of the first cell.

2. The flying capacitor device as claimed in claim 1, wherein said balancing circuit comprises an RLC resonant circuit in series.

3. The flying capacitor device as claimed in claim 2, wherein the balancing circuit comprises a switch connected in series with said RLC resonant circuit.

4. The flying capacitor device as claimed in claim 3, further comprising a bandpass filter the passband of which is centered on the switching frequency of the transistors, the bandpass filter being connected in parallel with the switch.

5. The flying capacitor device as claimed in claim 1, wherein the device comprises two switching cells.

6. The flying capacitor device as claimed in claim 1, further comprising a low-pass filter, wherein said balancing circuit comprises at least one inductor shared with said low-pass filter.

7. The flying capacitor device as claimed in claim 1, wherein the flying capacitor device is an inverter.

8. The flying capacitor device as claimed in claim 1, wherein the flying capacitor device is a boost converter.

9. A power conversion system for a vehicle, comprising the flying capacitor device as claimed in claim 1.

10. A vehicle comprising the power conversion system as claimed in claim 9.

11. A method for preloading the flying capacitor device as claimed in claim 3, the method comprising:
closing the switch;
preloading the flying capacitors so as to switch the switchable transistors of each cell at the switching frequency of the transistors;
comparing between the voltage of the capacitor of the first cell and a predetermined voltage; and
opening the switch when said voltage of the capacitor of the first cell is substantially equal to the predetermined voltage.

12. A method for preloading the flying capacitor device as claimed in claim 4, the method comprising:
measuring the voltage of the switch, in an open state, filtered by the bandpass filter,
closing the switch when the measured voltage exceeds a predetermined imbalance threshold;
preloading the flying capacitors so as to switch the switchable transistors of each cell at the switching frequency of the transistors,
comparing between the voltage of the capacitor of the first cell and a predetermined voltage; and
opening the switch when said voltage of the capacitor of the first cell is substantially equal to the predetermined voltage.

* * * * *